United States Patent Office 3,171,695
Patented Mar. 2, 1965

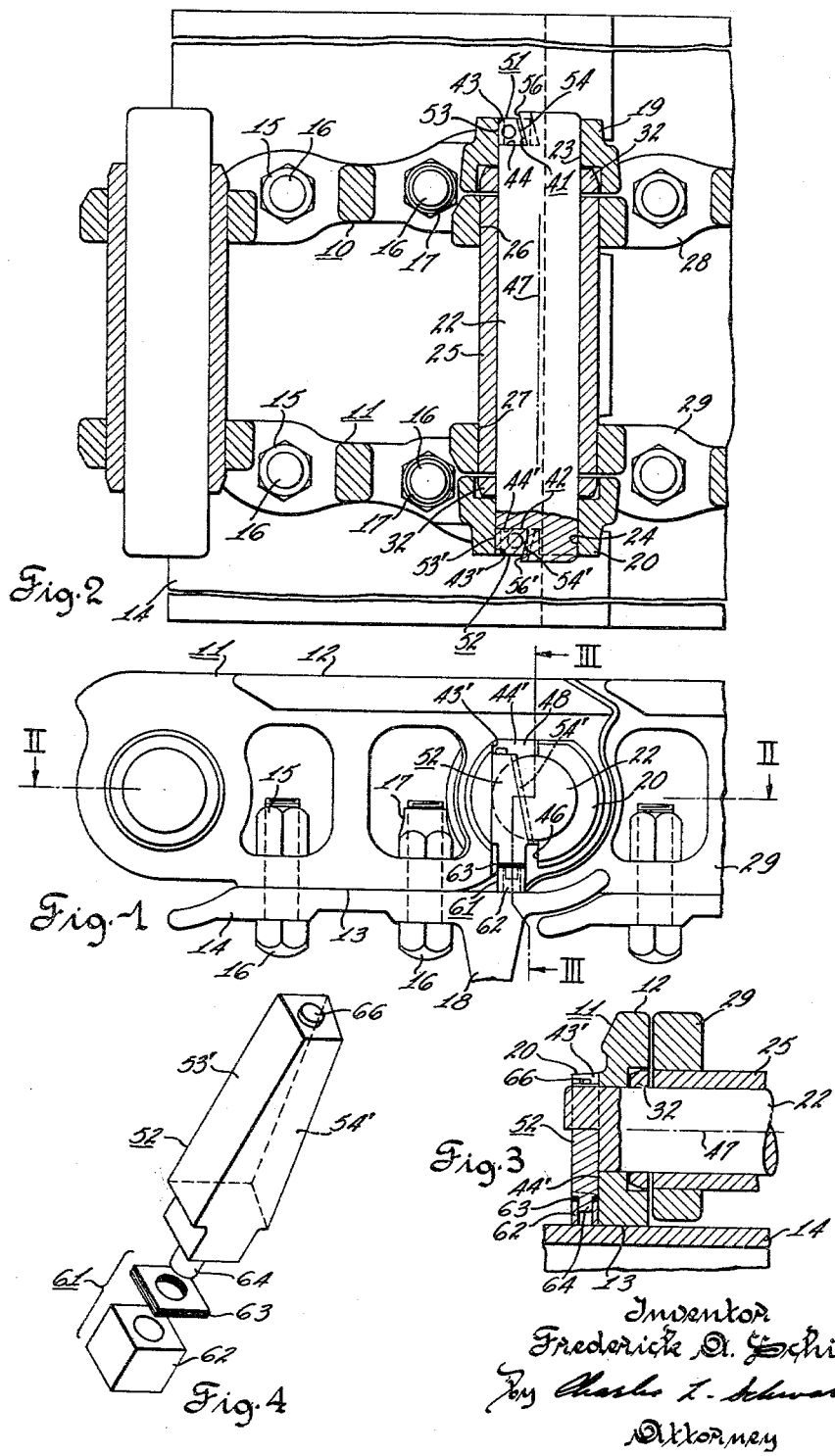

3,171,695
MASTER PIN LOCK
Frederick A. Schick, Springfield, Ill., assignor to Allis-Chalmers Manufacturing Company, Milwaukee, Wis.
Filed Dec. 2, 1963, Ser. No. 327,440
8 Claims. (Cl. 305—58)

This invention relates to means for locking the master pin of a track belt against rotation and axial displacement relative to the side bars in which installed.

Heretofore, numerous attempts have been made to provide a satisfactory master link in a pin and bushing type endless track. In such an endless track pivotal movement occurs between a pin and bushing and the pin and bushings are held by press fit in bores at opposite ends of the side bars. In the usual press fit of the pin and bushing in the bores of the side bars, the press fit is sufficiently tight to withstand any operation tending to work the pin or bushing loose, and the tightness of such press fits requires a special track pin press to take the endless track apart at each joint. The purpose of the master link of an endless track belt, is to permit easy connecting and disconnecting of the endless track so that it may be installed as an endless belt on the track frame of crawler tractor or disconnected for removal therefrom. Thus an important objective of any master link construction is to provide an arrangement which is easy to disconnect with conventional tools.

Heretofore, the master link shown in John S. Waddell, U.S. 3,101,221, August 20, 1963, Master Link for Endless Track, has been employed and in such a construction the master pin is prevented from endwise displacement and rotation by a pair of lugs welded to the track shoe. Experience with this type of master link has shown that there is some tendency for the pin to move or rotate slightly in its pin bore and when this occurs the pin will gradually pound out the bore.

It is an object of this invention to provide an easily removable master pin which is positively held against axial and rotative movement relative to the side bars in which installed.

It is an object of this invention to provide a master link construction wherein the master pin is wedged by a wedging member so as to positively hold the pin against any rotation or endwise movement relative to the side bars in which installed.

It is a further object of this invention to provide a master link wherein a wedging member is interposed between the side bar and the master pin and is held in place by the track shoe.

It is a further object of this invention to provide a master link of the hereinbefore outlined character wherein adjustment means are provided to insure that the taper member fits tightly between the pin and side bar when the shoe is secured to the side bar.

It is a further object of this invention to provide a master link which may be easily disconnected in the field by use of common hand tools.

These and other objects and advantages of this invention will be apparent to those familiar with the art when the following description is read in conjunction with the drawings in which:

FIG. 1 is a side view of that portion of an endless track containing a master link;

FIG. 2 is a section view taken along the lines II—II in FIG. 1;

FIG. 3 is a section view taken along the lines III—III in FIG. 1, and

FIG. 4 is an exploded view of the wedging member and spacer elements of this invention.

Referring to the drawings the master link of this invention is shown incorporated in a pin and bushing type endless track belt. The parallel master link side bars 10, 11 each have a rail surface 12 at their upper side and a shoe mounting surface 13 at their lower side for abutment with a track shoe 14 secured thereto by bolts 16 and nuts 15, 17. The shoe 14 has a conventional outwardly projecting cleat 18 for traction purposes. Corresponding ends of the master link side bars 10, 11 have coaxial pin bores, 23, 24 through their outwardly extending pin bosses 19, 20, which extend in axially opposite directions from laterally opposite sides of side bars 10, 11. The master pin 22 has a snug fit in the aligned bores 23, 24 as compared with a substantial press fit of the other pins of the track in their bores. A snug fit permits relatively easy removal of the master pin 22 from the side bars 10, 11.

A master bushing 25 is press fit in bushing bores 26, 27 at the ends of the standard side bars 28, 29 in a conventional manner. As is customary, the master bushing 25 is shorter in axial length than the standard bushings of the other track links. A pair of spacers 32 is provided as usual to properly position the master bushing.

The end portions of the pin 22 have tapered notches 41, 42 in confronting relation to vertical wedging surfaces 43, 43' of vertical recesses 44, 44' formed in the bosses 19, 20. Recess 44' is defined by oppositely facing vertical surfaces 43', 46 which are parallel to the axis 47 of the pin 22, and a surface 48 at right angles to surfaces 43', 46 and 47. A pair of wedging members 51, 52 are positioned in the notches 41, 42, respectively, and have diverging surfaces 53, 54 and 53', 54' on opposite sides thereof which are complementary to and in engagement with the wedging surfaces 43, 43' and wedging faces 56, 56' of notches 41, 42. The wedging faces 56, 56' taper upwardly in converging relation with wedging surfaces 43, 43' and also taper axially outwardly in converging relation to wedging surfaces 43, 43'.

The wedging members 51, 52 are held in place by releasable fastening means in the form of bolts 16 and nuts 15, 17 securing the shoe 14 to the side bars 10, 11. Spacing means 61 are provided for each wedging member to insure a substantial wedging force being applied to maintain the pin 22 against axial displacement and rotation relative to the side bars 10, 11 when the shoe 14 is installed. Each spacing means 61 includes a relatively thick spacing member 62 and a plurality of shim members 63. The wedging member 52 has a small cylindrical projection 64 at its bottom end which fits loosely into the inner bores of the members 62, 63, thus keeping the latter in place. A small projection 66 is provided at the upper end of the wedging member to facilitate its being hammered out of wedging engagement with the pin 22 and surface 43' without damage to the wedging surfaces of the wedging member.

An endless track, in use, is normally in tension and as illustrated in the drawings my wedging members 51, 52 cam the track pin 22 toward the side of the pin bores 23, 24 normally taking the load. This obviates loosening of the master track pin connection under load.

From the foregoing description, it is obvious that I have provided a master link construction which is easy to assemble and disassemble and further one which may be manufactured at a reasonable cost with conventional machine tools. It will be noted that the shoe 14 employed in my master link is a conventional shoe which is not altered in any way. By selecting the correct number of shim members 63 the wedging members are forced into proper wedging contact by installation of the shoe 14. Thus it is not necessary to provide fastening means to hold the wedging means in place other than the fastening means for the shoe 14.

Although a single embodiment of this invention has been illustrated, it is not intended to limit this invention except as necessitated by the scope of the appended claims.

The embodiments of the invention for which an exclusive property or privilege is claimed are defined as follows:

1. Means for locking a track pin in a track belt comprising:
   a pair of parallel side bars in spaced relation to one another having
   pin bosses on corresponding ends thereof extending in axially opposite directions from laterally remote sides of said side bars,
   aligned pin bores formed in said bosses,
   coplanar shoe mounting surfaces formed on the bottoms of said side bars, respectively, and
   a vertically extending recess formed in each of said bosses and presenting a wedging surface,
   a track pin in said aligned pin bores and having end portions extending into said recesses, respectively,
   a notch formed in each of said end portions of said pin in confronting relation to said wedging surfaces on said bosses, respectively, each of said notches presenting a wedging face in upwardly and axially outwardly converging relation to the confronting wedging surface,
   wedging means in said notches including a pair of wedging members having diverging surfaces on opposite sides thereof complementary to and in engagement with said wedging surfaces and wedging faces,
   a shoe in engagement with said shoe mouting surfaces of said side bars and in retaining engagement with said wedging means and
   fastening means releasably securing said shoe to said side bars.

2. The structure set forth in claim 1 wherein said wedging means includes shims interposed between each of said wedging members and said shoe.

3. Means for locking a track pin ina track belt including:
   a side bar having
   a bottom shoe mounting surface,
   a pin boss at one end of said side bar extending outwardly from the side thereof,
   a pin bore formed in said boss,
   a wall in said boss defining a wedging surface extending in a vertical direction,
   a track pin in said bore and having an end portion presenting a notch with a wedging face tapering upwardly toward said wedging surface at an acute converging angle,
   wedging means in said notch including a vertically insertable wedging member having diverging surfaces on opposite sides thereof in wedging engagement with said wedging surface and wedging face, said wedging member camming said track pin toward the side of said pin bore taking the load when said track belt is in tension, and
   a shoe releasably secured to said side bar in vertical thrust transmitting relation to said shoe mounting surface and in abutting relation to said wedging means, said shoe releasably maintaining said wedging member in wedging engagement with said wedging surface and wedging face.

4. The structure set forth in claim 3 wherein said wdeging face also converges toward said wedging surface in an axially outward direction.

5. The structure set forth in claim 4 wherein said wedging means includes a spacing member between said wedging member and said shoe.

6. Means for locking a track pin in a track belt comprising:
   a side bar having
   a pin boss at one end extending outwardly from one side thereof,
   a pin bore formed in said boss,
   a shoe mounting surface formed on the bottom of said side bar, and
   a vertically extending recess formed in said boss and presenting a wedging surface,
   a track pin in said pin bore and having an end portion extending into said recess,
   a notch formed in said end portion of said pin in confronting relation to said wedging surface on said boss, said notch presenting a wedging face in upwardly and axially outwardly converging relation to the confronting wedging surface,
   wedging means including a wedging member in said notch having diverging surfaces on opposite sides thereof complementary to and in engagement with said wedging surface and wedging face,
   a shoe in engagement with said shoe mounting surface of said side bar and in retaining engagement with said wedging means, and
   fastening means releasably securing said shoe to said side bar.

7. The structure set forth in claim 1 wherein said wedging means includes a shim interposed between said wedging member and said shoe.

8. The structure set forth in claim 6 wherein said wedging member cams said track pin toward the side of said pin bore taking the load when said track belt is in tension.

References Cited by the Examiner

UNITED STATES PATENTS 3,101,221   8/63   Waddell _____ 305—59 X

FOREIGN PATENTS 668,779   7/29   France.

ARTHUR L. LA POINT, *Primary Examiner.*